United States Patent [19]

Sadamatsu

[11] Patent Number: 5,307,166
[45] Date of Patent: Apr. 26, 1994

[54] AUTOMATIC IMAGE-TONE CONTROL CIRCUIT AND METHOD FOR CONTROLLING BRIGHTNESS OF IMAGE

[75] Inventor: Hideaki Sadamatsu, Hirakata, Japan

[73] Assignee: Matsushita Electric Industrial Co., Ltd., Kadoma, Japan

[21] Appl. No.: 973,917

[22] Filed: Nov. 10, 1992

[30] Foreign Application Priority Data

Jan. 14, 1992 [JP] Japan ................. 4-004603

[51] Int. Cl.[5] ................ H04N 5/14; H04N 5/202
[52] U.S. Cl. .................................. 348/687
[58] Field of Search .............. 358/166, 168, 37, 164; H04N 5/202, 5/235, 5/14, 5/205

[56] References Cited

U.S. PATENT DOCUMENTS

| | | |
|---|---|---|
| 4,422,095 | 12/1983 | Hosoya ................ 358/168 |
| 5,003,394 | 3/1991 | Lagoni ................ 358/168 |
| 5,089,891 | 2/1992 | Yamamoto ............ 358/164 |
| 5,196,937 | 3/1993 | Kageyama ............ 358/164 |

FOREIGN PATENT DOCUMENTS

| | | | |
|---|---|---|---|
| 54-80754 | 6/1979 | Japan ............ G03G 15/04 |
| 0219269 | 9/1986 | Japan ............ H04N 5/202 |
| 0087780 | 3/1990 | Japan ............ H04N 5/202 |
| 0126377 | 5/1991 | Japan ............ H04N 5/202 |
| 4-37263 | 2/1992 | Japan ............ H04N 5/202 |

Primary Examiner—James J. Groody
Assistant Examiner—Chris Grant
Attorney, Agent, or Firm—Cushman, Darby & Cushman

[57] ABSTRACT

In a tone control circuit of luminance signals, input-output characteristic having an arbitrary line graph is obtained by plural gradient adjusting circuits in response to frequencies of brightness of the luminance signals which are detected by plural IRE circuits.

13 Claims, 8 Drawing Sheets

AUTOMATIC IMAGE-TONE CONTROL CIRCUIT AND METHOD FOR CONTROLLING BRIGHTNESS OF IMAGE

FIELD OF THE INVENTION AND RELATED ART STATEMENT

1. FIELD OF THE INVENTION

The present invention relates to tone control of video signals and particularly relates to a circuit or a method for automatic tone control.

2. DESCRIPTION OF THE RELATED ART

The conventional tone control circuit for luminance signals is disclosed, for example, in Japanese unexamined patent application (TOKKAI) HEI 4-37263.

Figure 6:
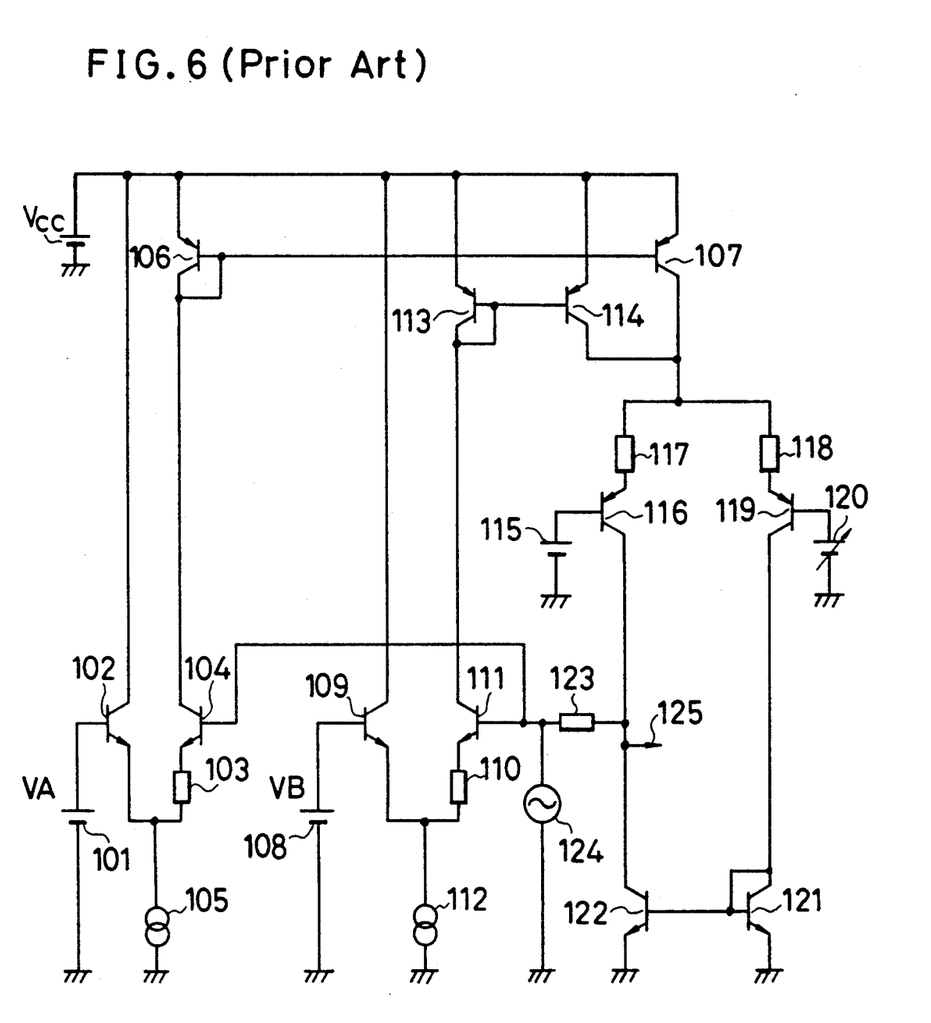
FIG. 6 is a circuit diagram showing the conventional tone control circuit.
Figure 7:
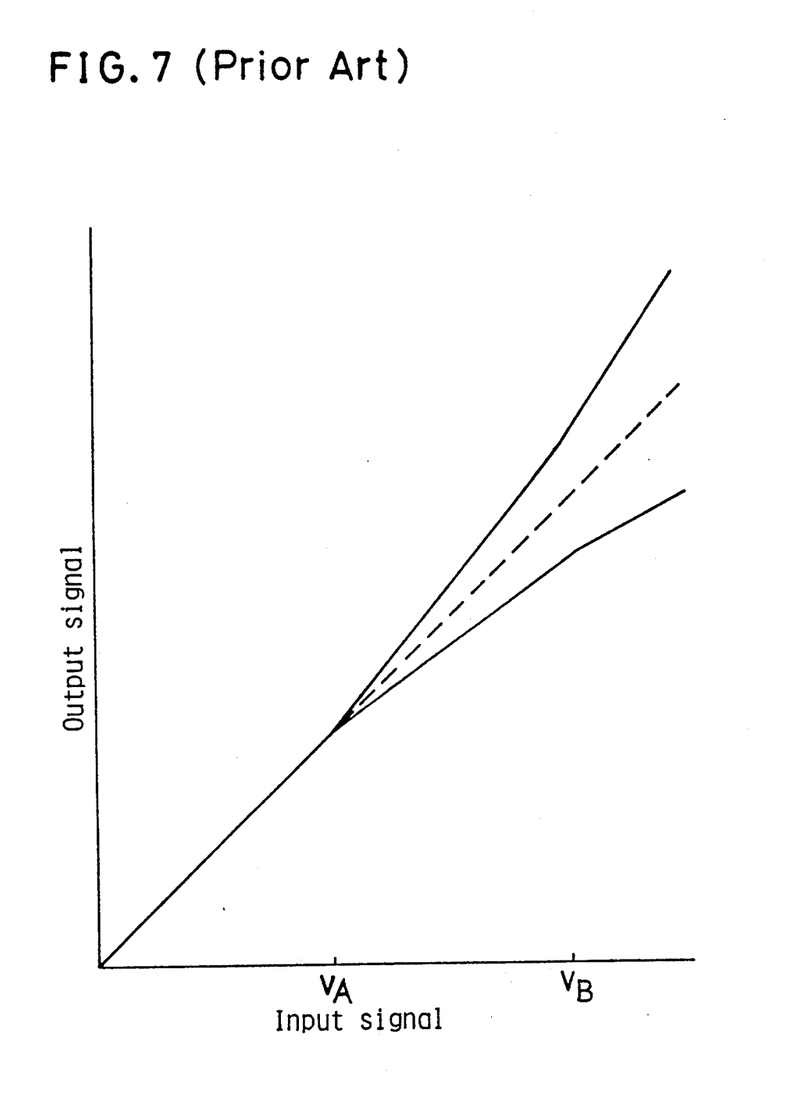
FIG. 7 is a graph showing the characteristic of the tone control circuit shown in FIG. 6.

FIG. 6 is a circuit diagram showing the above-mentioned conventional tone control circuit for the luminance signals, and FIG. 7 is a graph showing a characteristic of the tone control circuit shown in FIG. 6.

In FIG. 6, transistors 102, 104, 109, 111, 121 and 122 are of NPN type, and transistors 106, 107, 113, 114, 116 and 119 are of PNP type. The tone control circuit consists of these transistors 102, 104, 106, 107, 109, 111, 113, 114, 116, 119, 121, 122, resistors 103, 110, 117, 118, 123 and tile below-mentioned seven voltage or current sources. A voltage source 101 supplies the base of the transistor 102 with a constant DC voltage $V_A$. Another voltage source 108 supplies the base of the transistor 109 with a constant DC voltage $V_B$. The base of the transistor 111 is connected to a luminance signal voltage source 124. A voltage source 115 supplies the base of the transistor 116 with a constant DC voltage. A control voltage source 120 supplies the base of the transistor 119 with a control voltage. The emitters of the transistors 102 and 109 are connected to constant current sources 105 and 112, respectively.

In the above-mentioned conventional tone control circuit, when the luminance signal voltage exceeds the voltage $V_A$ of the voltage source 101, a current flows through the transistor 104. A value of this current is obtained by dividing a differential voltage between the luminance signal voltage and the voltage $V_A$ by a resistance value of the resistor 103. When the luminance signal voltage further increases and thereby exceeds the voltage $V_B$, a current flows through the transistor 111. A value of this current is obtained by dividing a differential voltage between the luminance signal voltage and the voltage $V_B$ by a resistance value of the resistor 110. The currents flowing through the transistors 104 and 111 also flow in a current mirror circuit consisting of the transistors 106 and 107 and another current mirror circuit consisting of the transistors 113 and 114, respectively. Currents flowing through the transistors 107 and 114 flow into a differential amplifier consisting of the transistors 116, 119 and the resistors 117 and 118. This current is controlled to enter or get out of the resistor 123 by the control voltage of the control voltage source 120 and a current mirror circuit consisting of the transistors 121 and 122. By adding a voltage generated between both ends of the resistor 123 to the luminance signal voltage of the luminance signal voltage source 124, a relation between the input signal of the voltage source 124 and the output signal 125 is changed as shown in FIG. 7. In FIG. 7, a straight line including a dotted line represents a proportional relation (1:1) between the input and the output. Curved solid lines over and below the dotted line represent characteristics obtained by adding the voltage of the resistor 123.

As shown in FIG. 7, once the line extends (diverges) from the straight line toward the upper or the lower lines, the line never converges back toward the straight line (represented by the dotted line). Therefore, it is impossible to obtain a desirable characteristic such that a signal range below the input voltage VA and a signal range over the input voltage $V_B$ can be made to have respective gradients which are independent from each other. As a result, it is impossible to realize the optimum control for a signal having respective distributions different from each other in a high brightness range and a low brightness range due to the non-linear characteristics of the above-described conventional tone control circuit.

OBJECT AND SUMMARY OF TITLE INVENTION

An object of the present invention is to offer an automatic tone control circuit which is capable of furnishing arbitrary gradients in response to conditions of luminance signals in order to compensate for non-linear characteristics included in video signals.

In order to achieve the above-mentioned object, an automatic tone control circuit of the present invention comprises:

a plurality of brightness frequency detection means for detecting respective frequencies of predetermined brightness ranges of luminance signals;

a plurality of first adding means for adding a predetermined signal to respective output signals of the brightness frequency detection means;

a plurality of amplifying means for amplifying respective output signals of the first adding means;

a plurality of second adding means for adding up output signals of the amplifying means in accordance with a predetermined order;

maximum voltage signal detection means for detecting a maximum voltage signal contained in the luminance signals;

feedback control means for controlling the amplifying means to equalize a final adding-up output signal of the second adding means with the maximum voltage signal; and a plurality of gradient adjusting means for adjusting respective gradients of input-output characteristic of the automatic tone control circuit at the every predetermined brightness ranges in response to plural output signals which are an output signal of first one of said amplifying means and respective output signals of said second adding means.

According to the above-mentioned automatic tone control circuit, an input-output characteristic can be controlled in response to frequencies of luminance signals in particular brightness range. Therefore, an optimum output is obtained in accordance with the present image.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, a preferred embodiment of the present invention is described with reference to the accompanying drawings.

Figure 1:
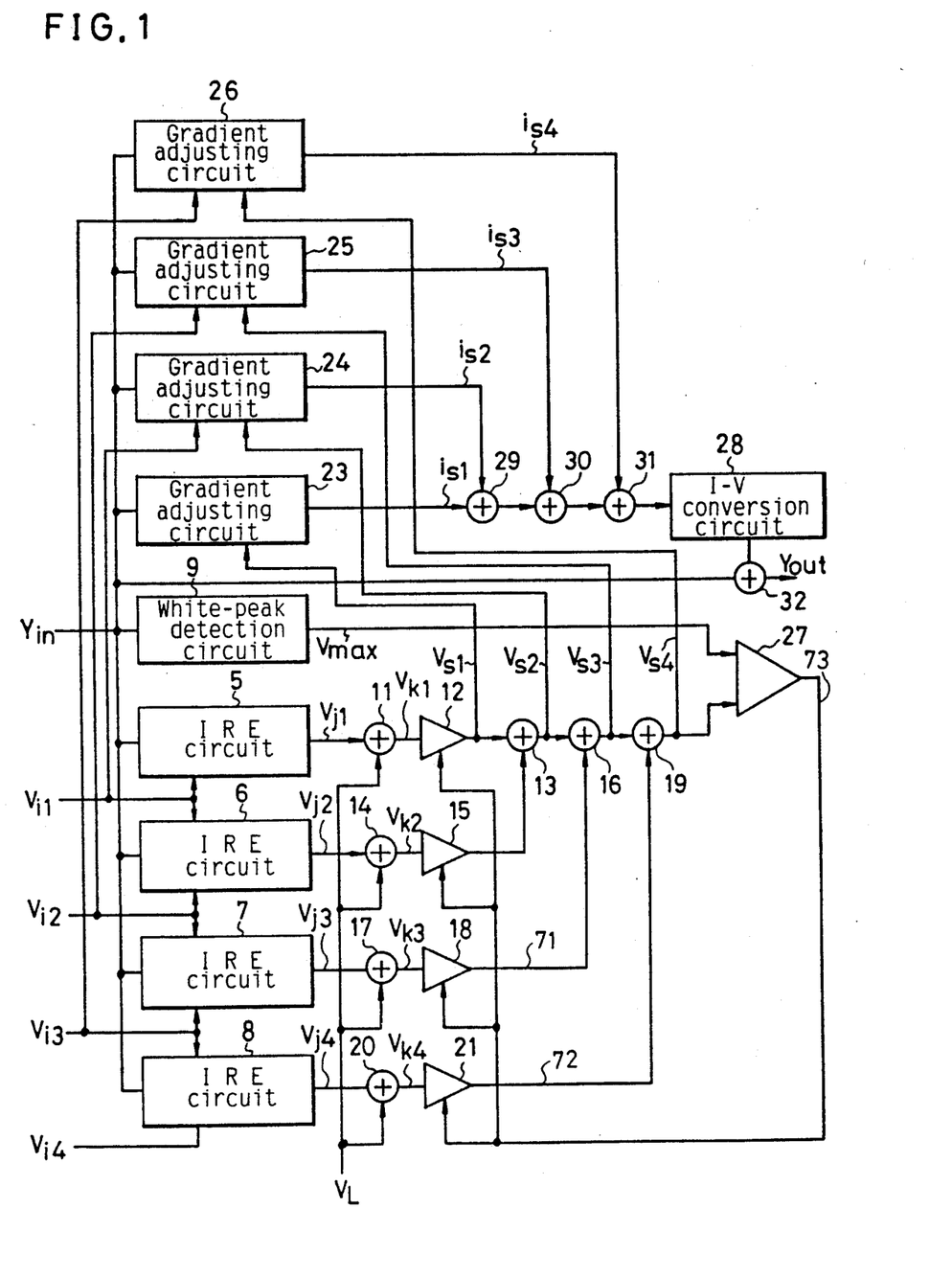
FIG. 1 is a block diagram showing an automatic tone control circuit of the present invention.
Figure 2A:
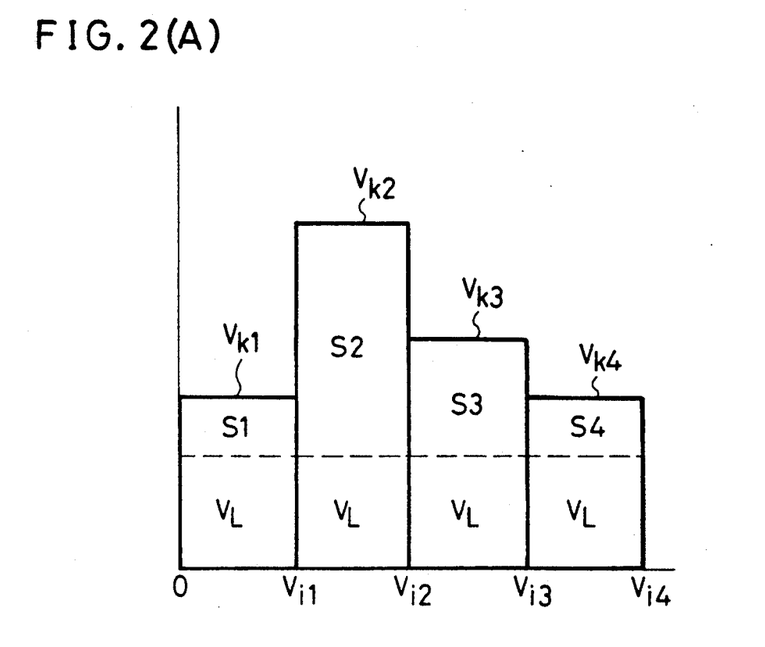
FIG. 2(A) is a graph showing frequencies of luminance signals.
Figure 2B:
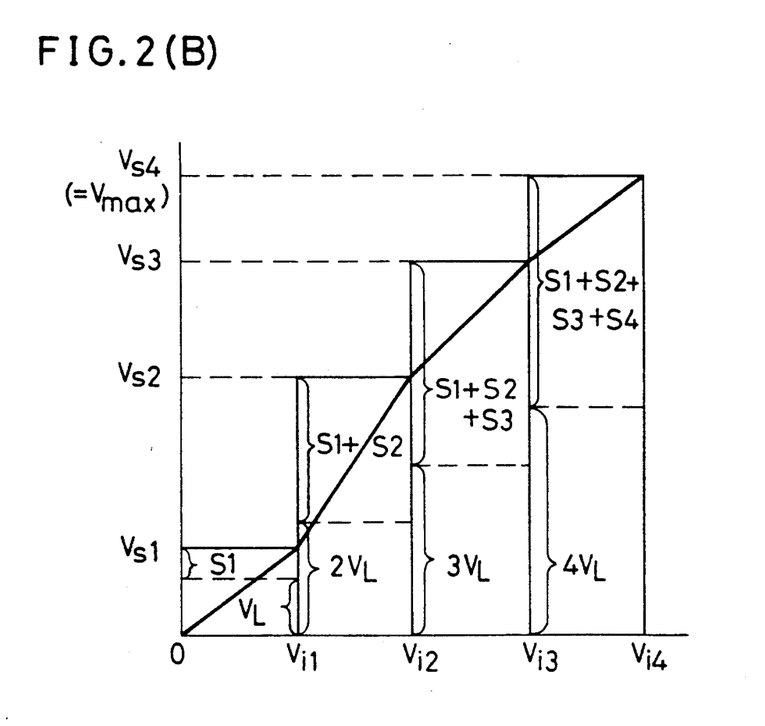
FIG. 2(B) is a graph showing input-output characteristic of the automatic tone control circuit shown in FIG. 1.
Figure 3:
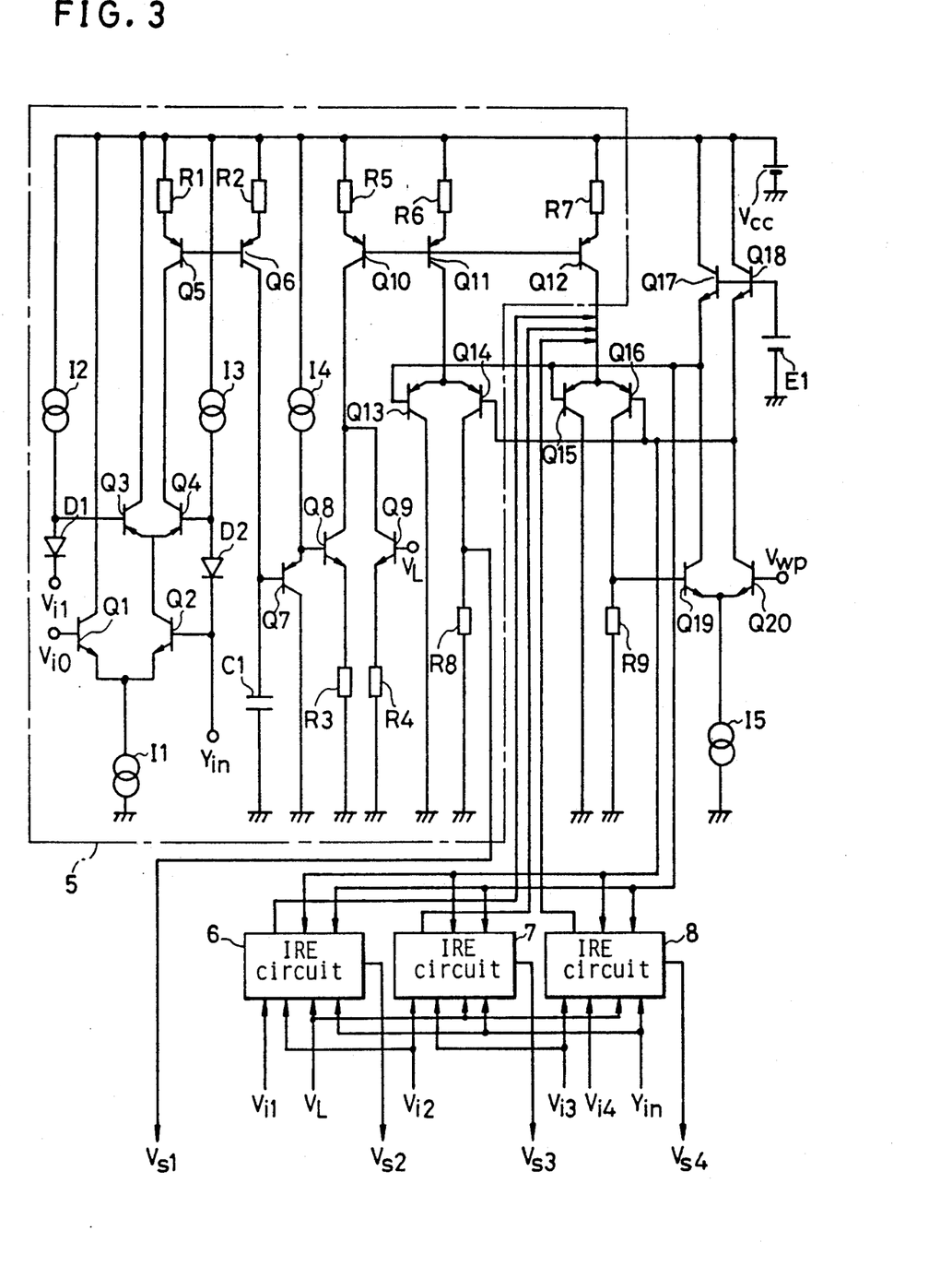
FIG. 3 is a circuit diagram showing an internal circuit of an IRE circuit shown in FIG. 1.
Figure 4:
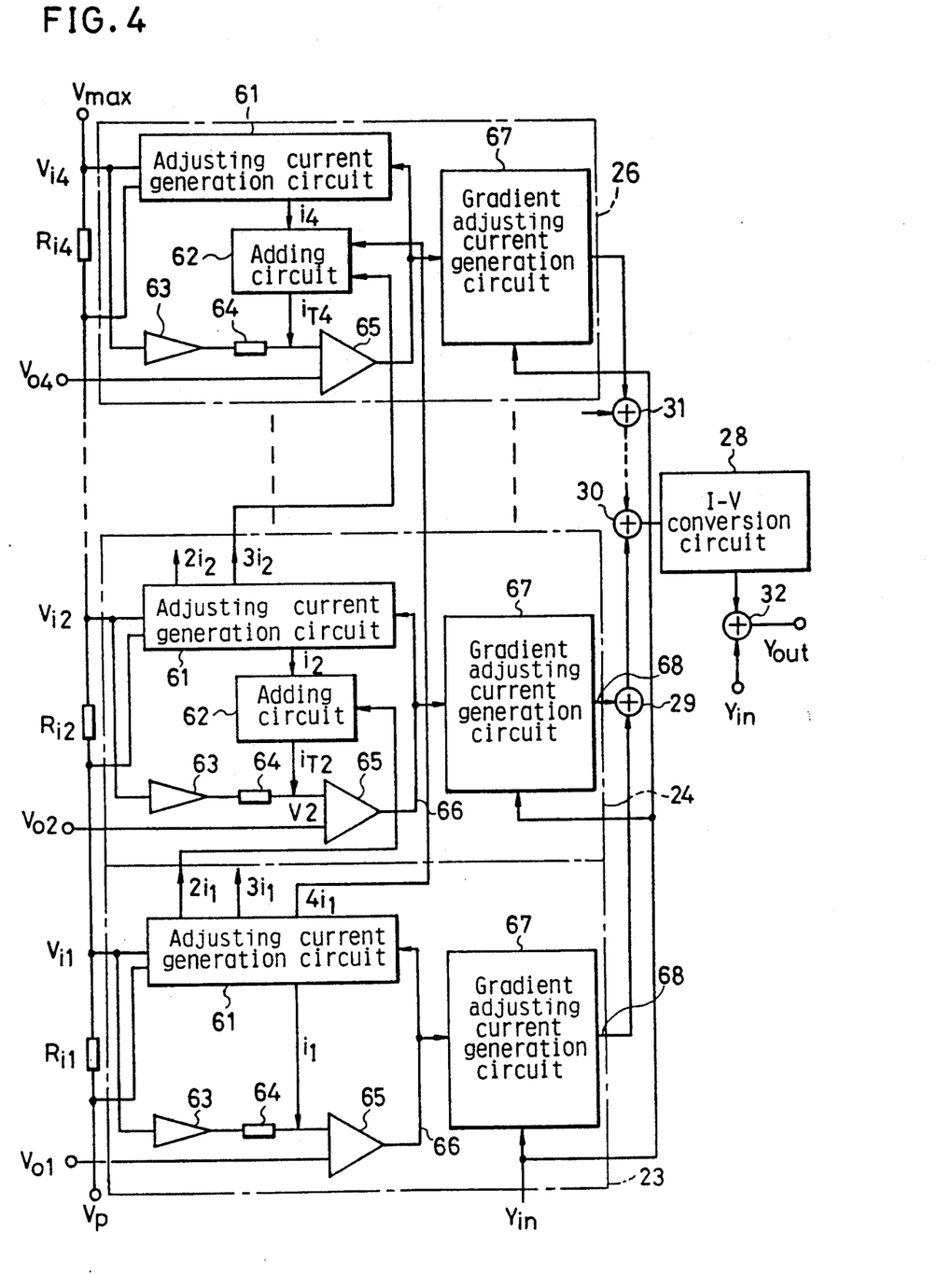
FIG. 4 is a block diagram showing an internal circuit of gradient adjusting circuits with its peripheral circuit shown in FIG. 1.
Figure 5:
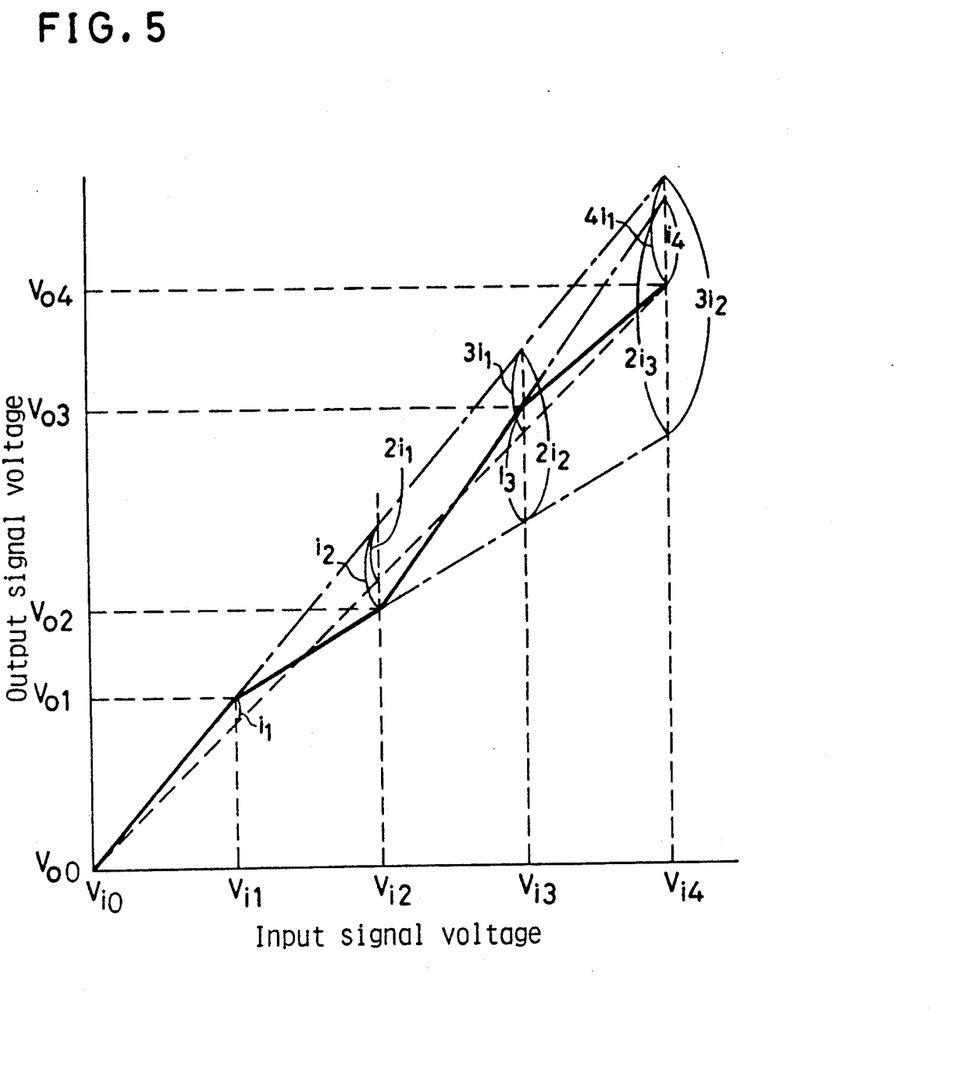
FIG. 5 is a graph showing a characteristic of the gradient adjusting circuit shown in FIG. 4.

FIG. 1 is a block diagram showing an automatic tone control circuit for luminance signals. FIG. 2(A) is a graph showing frequencies of luminance signals, and FIG. 2(B) is a graph showing input-output characteristic of the automatic tone control circuit. FIG. 3 is a circuit diagram showing an internal circuit of a known IRE circuit 5-8 in FIG. 1 (IRE: Initial letters of Institute for Radio Engineers, U.S.). Each of the IRE circuits 5-8 serves as a brightness frequency detection means. FIG. 4 is a block diagram showing internal circuits of gradient adjusting circuits 23-26 (illustration of the circuit 25 is omitted) shown in FIG. 1. FIG. 5 is a graph showing a characteristic of the gradient adjusting circuit shown in FIG. 4.

In the first place, operation of the automatic tone control circuit is described. In FIG. 1, a white peak voltage $V_{max}$ contained in an input signal $Y_{in}$ is extracted by a white-peak detection circuit 9 and is given to a comparator 27. A range of from 0 (zero shows the pedestal level in this description) to the white peak voltage $V_{max}$ is equally divided into four voltage ranges $0-V_{i1}$, $V_{i1}-V_{i2}$, $V_{i2}-V_{i3}$ and $V_{i3}-V_{i4}$ by a voltage dividing circuit, details whereof will be described later. Voltage signals 0 and $V_{i1}$ are inputted to the IRE circuit 5, and the IRE circuit 5 issues a voltage signal $V_{j1}$ which corresponds to a frequency of appearances of the voltage from 0 to $V_{i1}$. Voltage signals $V_{i1}$ and $V_{i2}$ are inputted to the IRE circuit 6, and the IRE circuit 6 issues a voltage signal $V_{j2}$ which corresponds to a frequency of appearances of the voltage from $V_{i1}$ to $V_{i2}$. Voltage signals $V_{i2}$ and $V_{i3}$ are inputted to the IRE circuit 7, and the IRE circuit 7 issues a voltage signal $V_{j3}$ which corresponds to a frequency of appearances of the voltage from $V_{i2}$ to $V_{i3}$. Voltage signals $V_{i3}$ and $V_{i4}$ are inputted to the IRE circuit 8, and the IRE circuit 8 issues a voltage signal $V_{j4}$ which corresponds to a frequency of appearances of the voltage from $V_{i3}$ to $V_{i4}$. These voltage signals $V_{j1}$, $V_{j2}$, $V_{j3}$ and $V_{j4}$ are added to a voltage signal $V_L$ at adders 11, 14, 17 and 20, thereby resulting in voltage signals $V_{k1}$, $V_{k2}$, $V_{k3}$ and $V_{k4}$, respectively. This voltage signal $V_L$ can be varied by an external circuit (not shown). Next, the voltage signal $V_{k1}$ is amplified by a gain control circuit 12 and is forwarded to the gradient adjusting circuit 23 as a voltage signal $V_{S1}$. Also, the voltage signals $V_{k2}$, $V_{k3}$ and $V_{k4}$ are amplified by gain control circuits 15, 18 and 21, respectively. Voltage signals amplified by the gain control circuits 12 and 15 are added to each other at an adder 13, and a resultant voltage signal $V_{S2}$ is forwarded to the gradient adjusting circuit 24. The voltage signal $V_{S2}$ and a voltage signal 71 amplified by the gain control circuit 18 are added to each other at an adder 16, and a resultant voltage signal $V_{S3}$ is forwarded to the gradient adjusting circuit 25. The voltage signal $V_{S3}$ and a voltage signal 72 amplified by the gain control circuit 21 are added to each other at an adder 19, and a resultant voltage $V_{S4}$ is forwarded to the gradient adjusting circuit 26. The voltage signal $V_{S4}$, which is a final voltage sum, is compared with the white-peak voltage $V_{max}$ at a comparator 27, and a resultant voltage signal 73 of comparison is used to control the gain control circuits 12, 15, 18 and 21. Thus, the voltage signal $V_{S4}$ becomes equal to the white peak voltage $V_{max}$. The gradient adjusting circuits 23, 24, 25 and 26 receive the voltage signals $V_{S1}$, $V_{S2}$, $V_{S3}$ and $V_{S4}$ and issue adjusting currents $i_{S1}$, $i_{S2}$, $i_{S3}$ and $i_{S4}$, respectively. The adjusting currents $i_{S1}$ and $i_{S2}$ are added to each other at an adder 29. An output current of the adder 29 and the adjusting current $i_{S3}$ are added to each other at an adder 30. Further, an output current of the adder 30 and the adjusting current $i_{S4}$ are added to each other at an adder 31. An output current of the adder 31 is inputted to an I-V conversion circuit 28 and is converted into an adjusting voltage. This adjusting voltage and the input signal $Y_{in}$ are added to each other at an adder 32, and a resultant voltage is issued as an adjusting output signal $Y_{out}$.

Next, input-output characteristics of the above-mentioned automatic tone control circuit is described. In FIG. 2(A), the frequency of appearance of the voltage signals in the range (hereinafter is simply referred to as the frequency of the voltage range) from 0 to $V_{i1}$ is represented as an integrated value S1; the frequency of the voltage range from $V_{i1}$ to $V_{i2}$ is represented as an integrated value S2; the frequency of the voltage range from $V_{i2}$ to $V_{i3}$ is represented as an integrated value S3; the frequency of the voltage range from $V_{i3}$ to $V_{i4}$ is represented as an integrated value S4. Each of these integrated values S1, S2, S3 and S4 is added to a constant voltage $V_L$, thereby resulting in the voltage signals $V_{k1}$, $V_{k2}$, $V_{k3}$ and $V_{k4}$, respectively. Next, in FIG. 2(B), the voltage signals $V_{S1}$, $V_{S2}$, $V_{S3}$ and $V_{S4}$ are obtained by the following addition of the voltage signals $V_{k1}$, $V_{k2}$, $V_{k3}$ and $V_{k4}$:

$$V_{S1} = V_{k1} = S1 + V_L$$

$$V_{S2} = V_{k1} + V_{k2} = S1 + S2 + 2V_L$$

$$V_{S3} = V_{k1} + V_{k2} + V_{k3} = S1 + S2 + S3 + 3V_L \text{ and}$$

$$V_{S4} = V_{k1} + V_{k2} + V_{k3} + V_{k4} = S1 + S2 + S3 + S4 + 4V_L.$$

The voltage signal $V_{S4}$ becomes equal to the white-peak voltage $V_{max}$ as a result of the afore-mentioned feedback control. When the adjusting is made by the gradient adjusting circuits 23, 24, 25 and 26 (FIG. 1) in response to the voltage signals $V_{S1}$, $V_{S2}$, $V_{S3}$ and $V_{S4}$, an input-output characteristic as shown by a line graph in FIG. 2(B) is obtained. As is apparent from this line graph, a gradient in a range from the voltage $V_{i1}$ to the voltage $V_{i2}$ is made largest because the frequency of this range has been very high. Thus, tone of image in this range is stretched, so that images with distinct contrasts can be obtained.

Next, operation of the IRE circuits 5-8 (FIG. 1), each of which detects a frequency of a specific brightness, is described concretely with reference to FIG. 3. In FIG. 3, although an internal circuit is shown only about the IRE circuit 5, other internal circuits of the IRE circuits 6, 7 and 8 are similar to the internal circuit of the IRE circuit 5. The circuit enclosed by a chain line is the internal circuit of the IRE circuit 5. The circuit of FIG. 3 consists of diodes D1, D2, transistors Q1-Q20, resistors R1-R9, current sources I1-I5, a voltage source E1 and a capacitor C1. Frequency of brightness is detected by the IRE circuits 5-8 in response to respective regions of brightness.

When a voltage of the luminance signal (input signal) $Y_{in}$ is between the voltages $V_{i0}(=0)$ and $V_{i1}$, a current $I_1$ flows through the collector of the transistor Q4 by means of the transistors Q1, Q2, Q3 and Q4. The current $I_1$ acts to charge the capacitor $C_1$ by means of a current mirror consisting of the transistors Q5, Q6 and the resistors R1, R2. This means that the frequency of brightness between the luminance levels (voltage signals) 0 and $V_{i1}$ has been detected. A voltage which appears on the capacitor C1 is converted to a current by the resistor R3, and to this current, a current obtained by converting the external voltage $V_L$ by the resistor R4 is added. Further, a current flows through the collector of the transistor Q12 by means of a current mirror consisting of the transistors Q10, Q12 and the resistors R5, R7. The current flowing through the collector of the transistor Q12 enters a differential amplifier consisting of the transistors Q15 and Q16, together with the similar currents generated in the IRE circuits 6, 7 and 8. A current flowing in the transistor Q16 is converted into a voltage output by the resistor R9, and this output voltage is compared with the white peak voltage $V_{wp}$ which is impressed to the base of the transistor Q20. Thus, the output voltage of the resistor R9 becomes equal to the white peak voltage as a result of the feedback control of the transistors Q17, Q18, Q15 and Q16. Further, the voltage signal $V_{S1}$, which corresponds to the frequency of brightness, is issued by a current mirror consisting of the transistors Q12, Q11 and the resistors R7, R6 and a differential amplifier Q13 and Q14. That is, in FIG. 2(B), the voltage signal $V_{S4}$ is equal to the white peak voltage $V_{wp}$, and outputs of the IRE circuits 5, 6, 7 and 8 are equal to the voltage signals $V_{S1}$, $V_{S2}$, $V_{S3}$ and $V_{S4}$, respectively.

Next, operation of the gradient adjusting circuits is described with reference to FIG. 4. A voltage between the maximum voltage $V_{max}$ and the pedestal voltage $V_p(=0)$ is divided by resistors $R_{i1}$, $R_{i2}$, $R_{i3}$ (illustration of $R_{i3}$ is omitted because of restriction of the paper size) and $R_{i4}$ into voltage signals $V_{i1}$, $V_{i2}$, $V_{i3}$ (illustration is omitted) and $V_{i4}$. These voltage signals $V_{i1}$, $V_{i2}$, $V_{i3}$ (illustration is omitted), $V_{i4}$, output setting voltage signals $V_{o1}$, $V_{o2}$, $V_{o3}$ (illustration is omitted), $V_{o4}$ and the input signal $Y_{in}$ are inputted to the gradient adjusting circuits 23-26 (illustration of the circuit 25 is omitted). Operation of the gradient adjusting circuits 23, 24 and 26 is described hereafter.

In the gradient adjusting circuit 24, the input setting voltage signals $V_{i1}$ and $V_{i2}$ are inputted to a adjusting current generation circuit 61. The adjusting current generation circuit 61 issues an adjusting current $i_2$, which is in proportion to a differential voltage between the input voltage $V_{i1}$ and $V_{i2}$, and its integer multiples. The current $i_2$ and an adjusting current $2i_1$ of the gradient adjusting circuit 23 are added to each other by an adding circuit 62 in the gradient adjusting circuit 24, and the adding circuit 62 issues an output current $i_{T2}$. The voltage $V_{i2}$ having passed through a buffer 63 and the adjusting current $i_{T2}$ flowing through an output resistor 64 give a voltage $V_2$ to an operational amplifier 65. The operational amplifier 65 compares the voltage $V_2$ and the output setting voltage $V_{o2}$ and issues a control signal 66. This control signal 66 is fed-back to the adjusting current generation circuit 61. The adjusting current $i_2$ is thus controlled to equalize the voltage $V_2$ with the voltage $V_{o2}$. The control signal 66 is also inputted to the gradient adjusting current generation circuit 67, so that an adjusting current 68 is issued from the gradient adjusting current generation circuit 67. The adjusting current 68 serves to change a gradient of input versus output at the time when the input signal is within a range from $V_{i1}$ to $V_{i2}$. In the similar way to the above, the gradient adjusting circuit 23 converts the input voltage $V_{i1}$ to the output voltage $V_{o1}$, and the gradient adjusting circuit 26 converts the input voltage $V_{i4}$ to the output voltage $V_{o4}$.

According to the above-mentioned gradient adjusting by the gradient adjusting circuits 23-26, gradient adjusting of the currents $i_1$, $i_2$, $i_3$ and $i_4$ is carried out to the input voltage signal $V_{i1}$, $V_{i2}$, $V_{i3}$ and $V_{i4}$ as shown in FIG. 5. Thus, a line graph, shown by solid lines, converges toward a dotted line representing a proportional relation (1:1) between the input and the output; thus, the gradient adjusting circuits compensate for any non-linear characteristics. Hereupon, the output signal voltages $V_{o1}$, $V_{o2}$, $V_{o3}$ and $V_{o4}$ correspond to the voltages $V_{s1}$, $V_{s2}$, $V_{s3}$ and $V_{s4}$ in FIG. 2(B), respectively.

According to the above-mentioned input-output characteristic, a luminance range of high frequency (of appearance) has a large gradient, so that a high contrast image can be obtained in that range. Further, only by keeping the maximum output setting voltage $(=V_{o4})$ under a voltage causing the blooming, generation of undesirable blooming is suppressed. Although in this embodiment the voltage $V_{i4}$ is used as the white peak voltage, another embodiment may be such that an externally setting voltage is used as the white peak voltage to obtain high contrast images.

In the above-mentioned embodiment, there are provided "four" gradient adjusting circuits 23-26 and "four" IRE circuits 5-8. However, the number of each of the gradient adjusting circuits 23-26 and the IRE circuits 5-8 may be another integer, e.g., three or five.

Figure 5A:
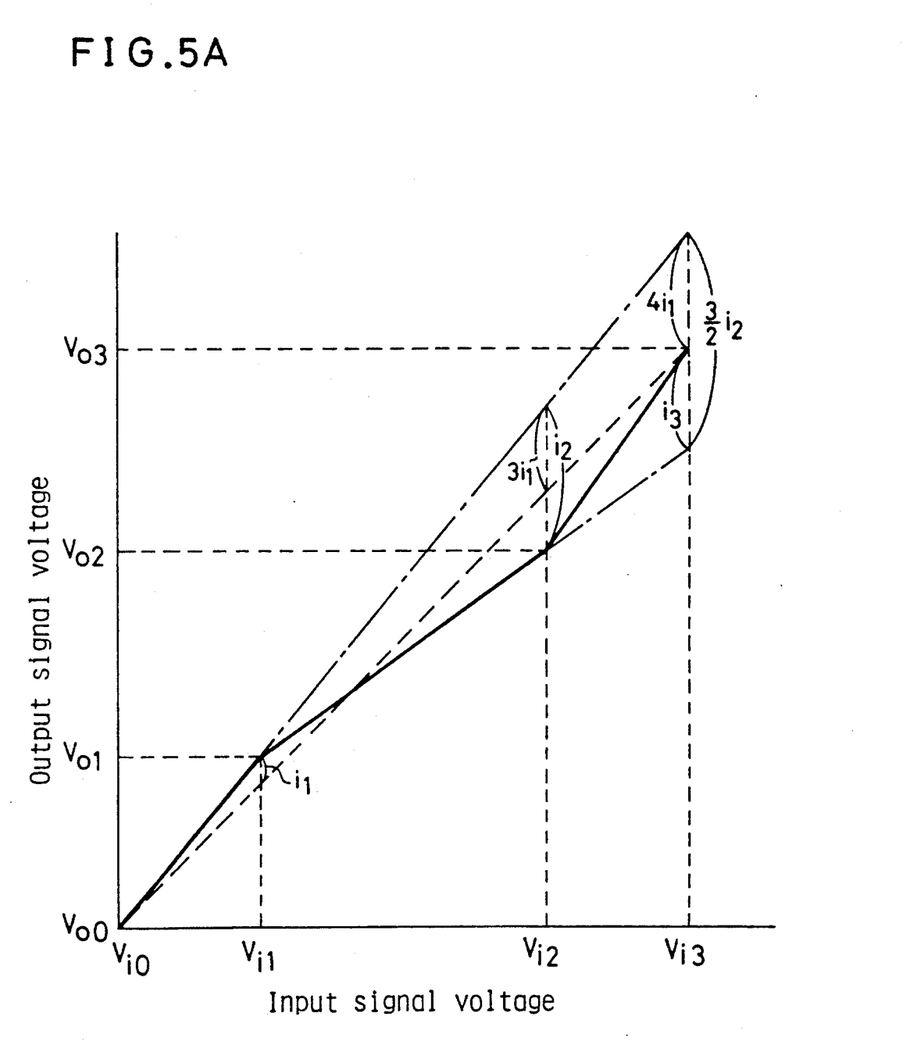
FIG. 5A is a graph showing another characteristic of the gradient adjusting circuits of the present invention.

Furthermore, apart from the above-mentioned embodiment wherein the maximum input signal voltage is equally divided into plural voltage ranges, another embodiment may be such that the maximum input signal voltage is divided into plural voltage ranges which are irregular in interval of range. An example of this "irregular ranges" is shown in FIG. 5A. In FIG. 5A, the input signal voltage range $V_{i1}$-$V_{i2}$ is twice as long as the input signal voltage $V_{i0}$-$V_{i1}$. The number of the circuits (IRE circuit, gradient adjusting circuit) required to obtain a characteristic shown by this line graph is three. An adjusting current "$3i_1$" flows from the first gradient adjusting circuit to the second gradient adjusting circuit, and an adjusting current for the range of $V_{i2}$-$V_{i3}$ is selected "$2i_1(=3i_1-i_1)$". An adjusting current supplied from the first gradient adjusting circuit to the second gradient adjusting circuit is represented by "(3/2)$i_2$". Thus, a tone control characteristic similar to that shown in FIG. 5 is obtained even though intervals of the ranges are different from each other.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An automatic tone control circuit comprising:
   a plurality of brightness frequency detection means for detecting respective frequencies of predetermined brightness ranges of luminance signals;
   a plurality of first adding means for adding a predetermined signal to respective output signals of said brightness frequency detection means;
   a plurality of amplifying means for amplifying respective output signals of said first adding means;
   a plurality of second adding means for adding up output signals of said amplifying means in accordance with a predetermined order;
   maximum voltage signal detection means for detecting a maximum voltage signal contained in said luminance signals;
   feedback control means for controlling said amplifying means to equalize a final adding-up output signal of said second adding means with said maximum voltage signal; and
   a plurality of gradient adjusting means for adjusting respective gradients of input-output characteristic of the automatic tone control circuit at said every predetermined brightness ranges in response to plural output signals which are an output signal of first one of said amplifying means and respective output signals of said second adding means.

2. An automatic tone control circuit in accordance with claim 1, wherein
   said maximum voltage signal detection means is a white-peak detection circuit which detects a signal corresponding to the brightest luminance included in said luminance signals.

3. An automatic tone control circuit in accordance with claim 2, wherein
   said predetermined signal added by said first adding means is variable.

4. An automatic tone control circuit in accordance with claim 3, wherein
   a brightness input range of said brightness frequency detection means is equal to a brightness input range of said gradient adjusting means.

5. An automatic tone control circuit in accordance with claim 4, wherein
   a ratio of intervals of brightness input ranges of one and the next one of brightness frequency detection means is equal to a ratio of one and the next one of adjusting currents for adjusting said gradients of input-output characteristic.

6. An automatic tone control circuit in accordance with claim 5, wherein
   respective amplification factors of said amplifying means are equal to each other.

7. An automatic tone control circuit in accordance with claim 1, wherein
   said predetermined signal added by said first adding means is variable.

8. An automatic tone control circuit in accordance with claim 1, wherein
   a brightness input range of said brightness frequency detection means is equal to a brightness input range of said gradient adjusting means.

9. An automatic tone control circuit in accordance with claim 1, wherein:
   a ratio of intervals of brightness input ranges of one and the next one of brightness frequency detection means is equal to a ratio of one and the next one of adjusting currents for adjusting said gradients of input-output characteristic.

10. An automatic tone control circuit in accordance with claim 1, wherein:
    respective amplification factors of said amplifying means are equal to each other.

11. A method for controlling brightness comprising the steps of:
    detecting frequencies of plural brightness ranges of luminance signals;
    detecting a white-peak voltage within several frames of input signals as a maximum output signal; and
    automatically adjusting respective gradients of input-output characteristic with a range from zero to said white-peak voltage in response to said frequencies in a manner that a gradient is increased in response to increase of a corresponding frequency in said frequencies.

12. A method for controlling brightness comprising steps of:
    detecting frequencies of plural brightness ranges of luminance signals;
    issuing plural voltage signals corresponding to said frequencies;
    adding a predetermined manually-selectable common voltage signal to said plural voltage signals;
    automatically adjusting respective gradients of input-output characteristic in response to resultant voltage signals of said adding in a manner that a gradient is increased in response to increase of a corresponding frequency in said frequencies.

13. An automatic tone control circuit comprising:
    a plurality of brightness frequency detection means for detecting respective frequencies of predetermined brightness ranges of luminance signals;
    a plurality of first adding means for adding a predetermined signal to respective output signals of said brightness frequency detection means;
    a plurality of amplifying means for amplifying respective output signals of said first adding means;
    a plurality of second adding means for adding up output signals of said amplifying means in accordance with a predetermined order;
    maximum voltage signal detection means for detecting a maximum voltage signal contained in said luminance signals;
    feedback control means for controlling said amplifying means to equalize a final adding-up output signal of said second adding means with said maximum voltage signal;
    a plurality of gradient adjusting means for adjusting respective gradients of input-output characteristic of the automatic tone control circuit at said every predetermined ranges in response to plural output signals which are an output signal of first one of said amplifying means and respective output signals of said second adding means;
    third adding means for adding up output currents issued from said gradient adjusting circuits; and
    current-voltage converting means for converting a final adding-up current of said third adding means into a voltage signal.

* * * * *